United States Patent
Jung et al.

(10) Patent No.: US 9,883,445 B2
(45) Date of Patent: Jan. 30, 2018

(54) METHOD AND APPARATUS FOR OPERATION IN COEXISTENCE ENVIRONMENT OF CELLULAR, NON-CELLULAR, MACRO AND MICRO NETWORKS

(71) Applicant: Samsung Electronics Co., Ltd, Gyeonggi-do (KR)

(72) Inventors: Byoung-Hoon Jung, Seoul (KR); Seung-Hoon Park, Seoul (KR); Jung-Min Moon, Gyeonggi-do (KR); Sun-Heui Ryoo, Gyeonggi-do (KR); Jung-Soo Jung, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/190,122

(22) Filed: Jun. 22, 2016

(65) Prior Publication Data
US 2016/0373992 A1  Dec. 22, 2016

Related U.S. Application Data

(60) Provisional application No. 62/182,943, filed on Jun. 22, 2015.

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0022* (2013.01); *H04W 36/0061* (2013.01);
(Continued)

(58) Field of Classification Search
CPC . H04W 36/14; H04W 48/16; H04W 36/0066; H04W 84/12; H04W 24/10;
(Continued)

(56) References Cited

U.S. PATENT DOCUMENTS

2011/0222523 A1  9/2011  Fu et al.
2014/0029420 A1  1/2014  Jeong et al.
(Continued)

OTHER PUBLICATIONS

International Search Report in connection with PCT International Application No. PCT/KR2016/006601, dated Sep. 22, 2016, 4 pages, International Application Division, Korean Intellectual Property Office, Daejeon, Republic of Korea.

(Continued)

*Primary Examiner* — Diane Mizrahi (57) ABSTRACT

The present disclosure relates to a pre-$5^{th}$-Generation (5G) or 5G communication system to be provided for supporting higher data rates beyond $4^{th}$-Generation (4G) communication system such as Long Term Evolution (LTE). A communication method by a cellular base station is provided. A method for performing communication by a cellular base station comprises transmitting information on a set of one or more non-cellular APs associated with the cellular base station to a UE and receiving information on an event triggered based on a measurement on at least one AP in the set from the UE.

20 Claims, 7 Drawing Sheets

(51) Int. Cl.
*H04W 36/04* (2009.01)
*H04W 84/12* (2009.01)
*H04L 5/00* (2006.01)
*H04W 36/14* (2009.01)
*H04W 48/10* (2009.01)

(52) U.S. Cl.
CPC ....... *H04W 36/0094* (2013.01); *H04W 36/04* (2013.01); *H04L 5/001* (2013.01); *H04W 36/0066* (2013.01); *H04W 36/14* (2013.01); *H04W 48/10* (2013.01); *H04W 84/12* (2013.01)

(58) Field of Classification Search
CPC .............. H04W 28/08; H04W 36/0022; H04W 36/0083; H04W 36/22; H04W 48/12; H04W 48/18; H04W 88/06
See application file for complete search history.

(56) References Cited

U.S. PATENT DOCUMENTS

| | | | |
|---|---|---|---|
| 2014/0115058 A1 | 4/2014 | Yin et al. | |
| 2014/0199996 A1* | 7/2014 | Wang | H04W 36/14 455/426.1 |
| 2015/0103657 A1* | 4/2015 | Henderson | H04W 36/0083 370/232 |
| 2016/0080958 A1* | 3/2016 | Rinne | H04W 24/10 370/338 |
| 2016/0277974 A1* | 9/2016 | Persson | H04W 48/16 |

OTHER PUBLICATIONS

Mediatek Inc., "WLAN Measurement Reporting," R2-152133, 3GPP TSG RAN2 Meeting #90, Fukuoka, Japan, May 15, 2015, 8 pages.

CATT, "Considerations on WLAN Measurements," R2-152129, 3GPP TSG RAN2 Meeting #90, Fukuoka, Japan, May 15, 2015, 5 pages.

ZTE, "Consideration on UE WLAN Measurement for the LTE/WLAN Aggregation and Interworking Enhancements," R2-152238, 3GPP TSG RAN2 Meeting #90, Fukuoka, Japan, May 15, 2015, 9 pages.

ITRI, "WLAN Measurement Configuration and Reporting," R2-152356, 3GPP TSG RAN2 Meeting #90, Fukuoka, Japan, May 15, 2015, 5 pages.

International Searching Authority, "Written Opinion of the International Searching Authority," PCT International Application No. PCT/KR2016/006601, dated Sep. 22, 2016, 5 pages, International Application Division, Korean Intellectual Property Office, Daejeon, Republic of Korea.

* cited by examiner

| AP #1 ID | AP #2 ID | AP #3 ID | AP #4 ID |

FIG.3

| AP #1 ID | AP Set #1 ID | AP #3 ID | AP Set #2 ID |

FIG.4

| AP Set #1 ID | AP #1 ID | AP #2 ID | AP Set #2 ID | AP #3 ID |

METHOD AND APPARATUS FOR OPERATION IN COEXISTENCE ENVIRONMENT OF CELLULAR, NON-CELLULAR, MACRO AND MICRO NETWORKS

CROSS-REFERENCE TO RELATED APPLICATION(S) AND CLAIM OF PRIORITY

The present application is related to and claims the benefit under 35 U.S.C. §119(a) of a U.S. patent application filed in the United States Patent and Trademark Office on Jun. 22, 2015 and assigned U.S. Provisional Application No. 62/182, 943, the entire disclosure of which is incorporated herein by reference.

TECHNICAL FIELD

Embodiments of the present disclosure relate to methods and apparatuses for operating in co-existence environments where cellular, non-cellular, macro, and micro networks, and more specifically, to methods and apparatuses for supporting various networks by identifying and controlling micro cell access points (APs) or their groups that may be configured in cellular or non-cellular techniques.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP) transmission and reception, reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Communication systems are evolving to support a higher data rate to meet the demand for steadily increasing radio data traffic. For example, communication systems are in development to have enhanced spectral efficiency and increased channel capability based on a diversity of schemes including the MIMO and the orthogonal frequency division multiplexing (OFDM) to increase the data rate.

Further, communication systems have grown with different objects depending on their applicability and uses and different frequency bands, physical layer transmission methods, resource sharing methods, and channel occupancy methods, and various radio access technologies (RATs) have been developed, standardized, and commercially available. As such, the technologies standardized and commercially available may include cellular techniques, such as code division multiple access (CDMA) and 3GPP long term evolution (LTE), and non-cellular short-range wireless communication techniques, such as wireless local area network (WLAN), Bluetooth, or ZigBee. There may also be a network architecture supporting wide coverage such as micro cells or a network architecture supporting only narrow coverage, such as micro cells, pico cells, femto cells, and small cells. Conventional smart devices are equipped with a wireless terminal availing itself of at least one or more, commonly two or more of such techniques.

Accordingly, a growing demand is being created for systems and apparatuses to attain such advantages as dynamic resource allocation, centralized network control and management, real-time load balancing, and support of seamless mobility in a network environment where multiple wireless communication techniques co-exist.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide methods and apparatuses for efficiently supporting a communication environment where multiple networks co-exist.

Objects of the present disclosure are not limited to the foregoing, and other unmentioned objects would be apparent to one of ordinary skill in the art from the following description.

To achieve the above objects, according to an embodiment of the present disclosure, a method for performing communication by a cellular base station comprises transmitting information on a set of one or more non-cellular access points (APs) associated with the cellular base station to a user equipment (UE) and receiving information on an event triggered based on a measurement on at least one AP in the set from the UE.

To achieve the above objects, according to an embodiment of the present disclosure, a cellular base station comprises a transceiver and a processor connected with the transceiver, the processor configured to transmit information on a set of one or more non-cellular access points (APs) associated with the cellular base station to a user equipment (UE) and receive information on an event triggered based on a measurement on at least one AP in the set from the UE.

To achieve the above objects, according to an embodiment of the present disclosure, a method for performing communication by a user equipment (UE) comprises receiving information on a set of one or more non-cellular access points (APs) associated with a cellular base station from the cellular base station, detecting an event triggered based on a measurement on at least one AP in the set, and transmitting the information on the triggered event to the cellular base station.

To achieve the above objects, according to an embodiment of the present disclosure, a user equipment (UE) comprises a transceiver and a processor connected with the transceiver, the processor configured to receive information on a set of one or more non-cellular access points (APs)

associated with a cellular base station from the cellular base station, detect an event triggered based on a measurement on at least one AP in the set, and transmit information on the triggered event to the cellular base station.

Details of other embodiments are set forth in the detailed description and the drawings.

Embodiments of the present disclosure present the following effects, at least.

A system capable of efficient operation may be provided in an environment where cellular, non-cellular, macro, and micro networks co-exist.

Further, there may be provided a cellular base station capable of efficient operation in an environment of cellular, non-cellular, macro, and micro networks co-exist and a communication method for the cellular base station.

Further, there may be provided a user equipment (UE) capable of efficient operation in an environment of cellular, non-cellular, macro, and micro networks co-exist and a communication method for the UE.

The effects of the present disclosure are not limited thereto, and the disclosure encompasses other various effects.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication terminal and system.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Although the terms "first" and "second" are used to describe various components, the components are not limited by the terms. These terms are provided simply to distinguish one component from another. Accordingly, the first component mentioned herein may also be the second component within the technical spirit of the present disclosure.

Figure 1:
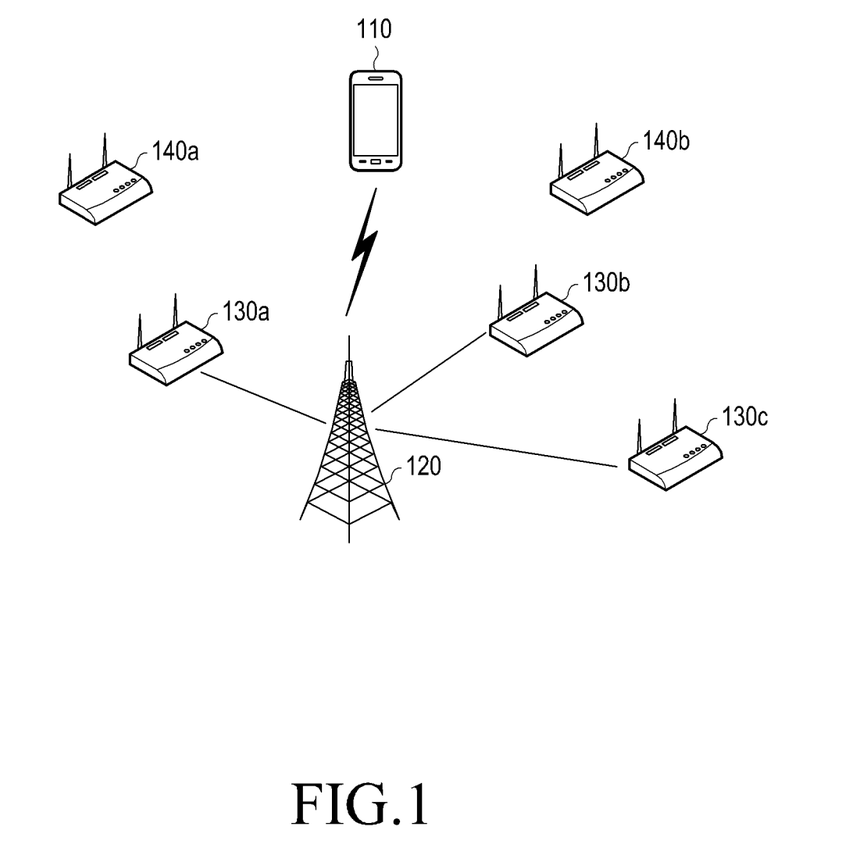
FIG. 1 illustrates an example wireless communication environment according to an embodiment of the present disclosure.

FIG. 1 illustrates an example a wireless communication environment according to an embodiment of the present disclosure. Referring to FIG. 1, the wireless communication environment may include a user equipment (UE) 110, a cellular base station 120, and multiple access points (APs) 130a, 130b, 130c, 140a, and 140b.

The cellular base station 120 may provide the UE 110 with access to the network using a radio access technology (RAT), such as CDMA, LTE, or global system for mobile communication (GSM). The cellular base station 120 may be denoted in other equivalent terms known in the related art, such as a macro base station, node B (NodeB), or evolved NodeB (eNB).

The multiple APs 130a, 130b, 130c, 140a, and 140b may provide the UE 110 with access to the network using a RAT different from that used by the cellular base station 120. For example, the APs 130a, 130b, 130c, 140a, and 140b may use short-range communication techniques, such as wireless local area network (WLAN), Bluetooth, or ZigBee. In some embodiments, the multiple APs 130a, 130b, 130c, 140a, and 140b may be base stations providing smaller coverage than that by the cellular base station 120 using the same RAT as that used by the cellular base station 120. Not all of the APs 130a, 130b, 130c, 140a, and 140b necessarily use the same RAT, and the APs 130a, 130b, 130c, 140a, and 140b, respectively, may use different RATs. The term "AP" may also be denoted a micro or small base station, femto base station, or piconet coordinator (PNC).

Some of the APs 130a, 130b, 130c, 140a, and 140b may be associated with the cellular base station 120. The APs 130a, 130b, and 130c associated with the cellular base station 120 are directly connected with the cellular base station 120, and the operation of the APs 130a, 130b, and 130c may be controlled by the cellular base station 120. The APs 130a, 130b, and 130c associated with the cellular base station 120 may be APs installed and operated by the service provider running the cellular base station 120.

Some of the APs 130a, 130b, 130c, 140a, and 140b may not be associated with the cellular base station 120. The APs 140a and 140b not associated with the cellular base station 120 may be indirectly connected with the cellular base station 120 via, e.g., a gateway, and the operations of the APs 140a and 140b may not be controlled by the cellular base station 120. The APs 140a and 140b not associated with the cellular base station 120 may be installed and operated regardless of the service provider running the cellular base station 120 (e.g., by individuals).

Figure 2:
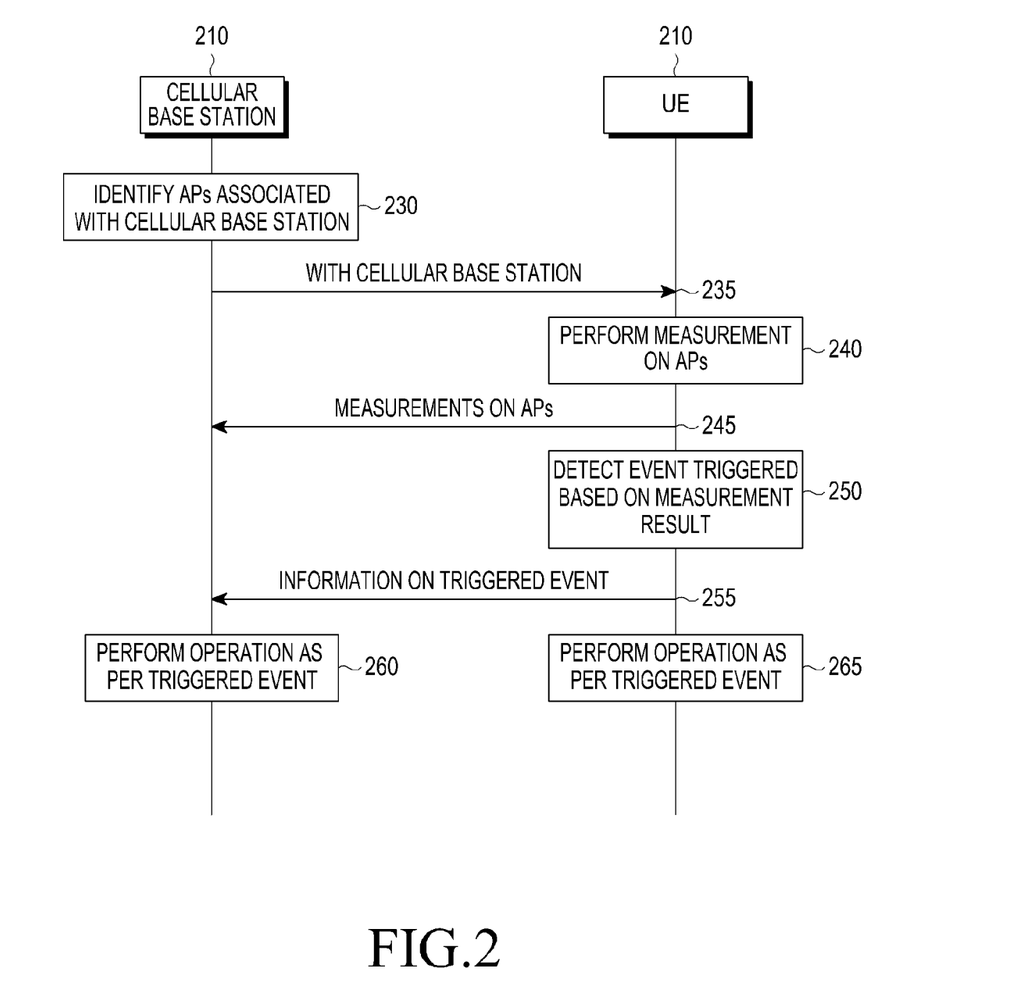
FIG. 2 illustrates an example flowchart illustrating an operation of a cellular base station and UE according to an embodiment of the present disclosure.

There is required a scheme for supporting operations, such as efficient mobility management for terminals, in the communication environment where the cellular and non-cellular networks and macro and micro networks co-exist as shown in FIG. 1. This is described below with reference to FIG. 2. FIG. 2 illustrates an example a flowchart of an operation of a cellular base station and UE according to an embodiment of the present disclosure.

Referring to FIG. 2, in operation 230, the cellular base station 210 may identify APs associated with the cellular base station 210. For example, the cellular base station 120 of FIG. 1 may identify the APs 130a, 130b, and 130c. Identifying the APs associated with the cellular base station 210 may include setting the respective identifiers (IDs) of the associated APs.

When an AP associated with the cellular base station 210 is a WLAN AP, the ID of the AP may be set as the basic service set ID (BSSID) of the media access control (MAC) address, which is the unique address of the WLAN AP, the ID assigned to each WLAN AP by the network, a predetermined portion of the BSSID, a particular function based on particular information such as the hash value and/or unique information on the AP (e.g., MAC address), or a value produced as a result of applying an equation thereto. When the ID of the WLAN AP is determined using the ID assigned to each WLAN AP by the network, the network manager may assign the ID of each AP as per a particular rule or randomly. The network manager, when aware of the information and IDs of the APs present in an adjacent area, may assign the ID of a new AP not to overlap the IDs of the existing APs in the adjacent area. The network manager may assign the same ID to one or more APs according to a particular network managing scheme.

When an AP associated with the cellular base station 210 is a Bluetooth or ZigBee PNC, the ID of the AP may be set as the MAC address, which is the unique address of the PNC or other particular address, the ID assigned to each PNC by the network, a predetermined portion of the unique address, a particular function based on particular information such as the hash value and/or unique information on the PNC (e.g., MAC address), or a value produced as a result of applying an equation thereto. When the ID of the PNC is determined using the ID assigned to each PNC by the network, the network manager may assign the ID of each PNC as per a particular rule or randomly. The network manager, when aware of the information and IDs of the PNCs present in an adjacent area, may assign the ID of a new PNC not to overlap the IDs of the existing PNCs in the adjacent area. The network manager may assign the same ID to one or more PNCs according to a particular network managing scheme.

Also when the APs associated with the cellular base station 210 are other small cells, e.g., 60 GHz WLANs using an ultra-high frequency band of 6 GHz or more or 28/38/60 GH mmWave transmitters, a similar way to setting the ID of the WLAN AP or PNC may be used to set the IDs of the APs.

According to an embodiment of the present disclosure, the cellular base station 210 may identify APs associated with the cellular base station 210 as a set (or group) including one or more APs. The cellular base station 210 may differentiate the APs associated with the cellular base station 210 as one or more sets. The cellular base station 210 may determine that all of the APs associated with the cellular base station 210 are included in one set and may determine that all of the APs are in a plurality of sets depending on the geographical location of the APs or unique information of the APs. According to an embodiment of the present disclosure, the APs supporting different RATs may be differentiated in different sets.

The cellular base station 210 may determine the ID of a set of the APs associated with the cellular base station 210. When the associated APs are WLAN APs, the cellular base station may determine the ID of the set of the APs using the service set ID (SSID), extended SSID (ESSID), or homogeneous ESSID (HESSID) shared by the APs in the set. Or, the ID of the set of the APs may also be determined by the ID assigned to a set of APs by the network, SSID, a predetermined portion of the SSID or ESSID, or a value produced as a result of applying a particular function or equation based on particular information, such as the hash value, and/or unique information of the AP (e.g., the MAC address). When the ID of the set of the WLAN APs is determined using the ID assigned to each WLAN AP by the network, the network manager may assign the ID of the set of the APs as per a particular rule or randomly. The network manager, when aware of the information and IDs of the sets of APs present in an adjacent area, may assign the ID of a new AP set not to overlap the IDs of the existing AP sets in the adjacent area. The network manager may assign the same ID to one or more AP sets according to a particular network managing scheme.

Also when the APs associated with the cellular base station 210 are Bluetooth or ZigBee PNCs or 60 GHz WLANs using an ultra-high frequency band of 6 GHz or more or 28/38/60 GH mmWave transmitters, a similar way to setting the ID of the WLAN AP set may be used to set the ID of the AP set.

According to an embodiment of the present disclosure, the cellular base station 210 may determine that the BSSID (48 bits) of the AP is the ID of the AP and that the SSID (256 bits) of the AP is the ID of the AP set. In such case, the APs having the same SSID may be classified in one set.

According to an embodiment of the present disclosure, the cellular base station 210 may determine that the BSSID (48 bits) of the AP is the ID of the AP and that the ID of the AP set is an ID having a particular size (e.g., 8 bits) assigned by the network manager (e.g., the cellular base station 210).

According to an embodiment of the present disclosure, the cellular base station 210 may determine that the BSSID (48 bits) of the AP is the ID of the AP and that a portion of the BSSID is the ID of the AP set. The portion of the BSSID determined as the ID of the AP set may be as many bits as a number designated by the LSB or MSB of the BSSID or bits in any portion of the BSSID. The information regarding the portion of the BSSID determined as the ID of the AP set may be previously transmitted or notified by the network or may be transmitted simultaneously or sequentially with the IDs of the APs.

In operation 230, the cellular base station may identify all of each of the associated APs and the set of the associated APs. According to an embodiment of the present disclosure, the cellular base station may identify only one of each associated AP and the set of the associated APs.

In operation 235, the cellular base station 210 may transmit information on the APs identified in operation 230 to the UE 220. The cellular base station 210 may transmit, to the UE 220, both or any one of the information on each of the APs associated with the cellular base station 210 (i.e., the respective IDs of the APs) and the information on the set of the associated APs (i.e., the ID of the AP set).

The cellular base station 210 may transmit the information on the identified APs in a measurement request frame, e.g., the measConfig information element (IE) in the RRC-ConnectionReconfiguration message of LTE. However, embodiments are not limited thereto, and the information on the identified APs may also be transmitted in other MAC or PHY-based frame.

Figure 3:
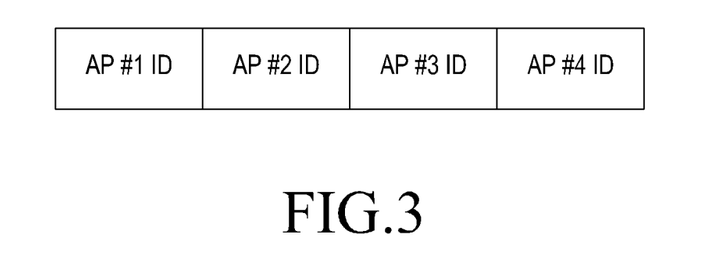
FIGS. 3-5 illustrate examples transmission schemes for transmitting IDs of APs from a cellular base station to a UE according to an embodiment of the present disclosure.
Figure 4:
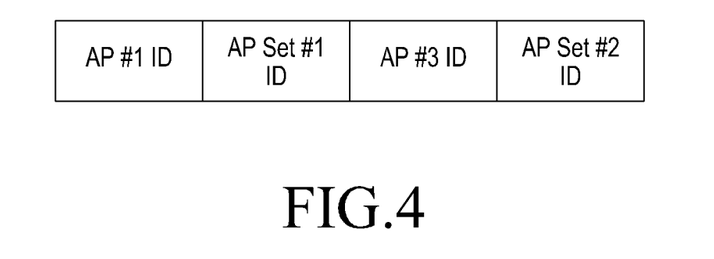
Figure 5:
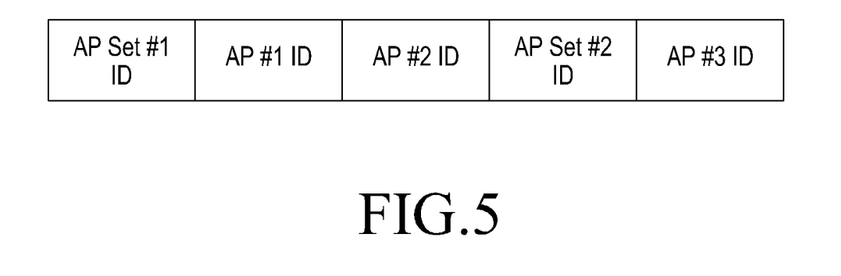

A method for transmitting the information on the APs identified in operation 235 is described below in greater detail with reference to FIGS. 3 to 5. FIGS. 3 to 5 illustrate examples transmission schemes for transmitting IDs of APs from a cellular base station to a UE, according to an embodiment of the present disclosure.

According to an embodiment of the present disclosure, as shown in FIG. 3, the cellular base station 210 may transmit only the IDs of the associated APs to the UE 220. When only one AP set is configured between the cellular base station 210 and the UE 220, the cellular base station 210 transmits only the IDs of the associated APs to the UE 220, and thus, the UE 220 may recognize that the APs having the received IDs are included in the set.

According to an embodiment of the present disclosure, as shown in FIG. 4, the cellular base station 210 may transmit the IDs of the APs and the IDs of the AP sets, in bundle, to the UE 220. The UE 220 may recognize that the APs are members of the AP set bundled therewith. For example, when receiving the information regarding the APs as shown in FIG. 4, the UE 220 may recognize that AP #1 is included in AP set #1, and AP #2 is included in the AP set #2. Although FIG. 4 illustrates an example in which the IDs of the APs are transmitted ahead of the IDs of the AP sets, embodiments of the present disclosure are not limited thereto.

According to an embodiment of the present disclosure, as shown in FIG. 5, the cellular base station 210 may transmit the ID of the AP set and may sequentially transmit the IDs of the APs included in the AP set. For example, when receiving the information regarding the APs as shown in FIG. 5, the UE 220 may recognize that AP #1 and AP #2 are included in AP set #1, and AP #3 is included in the AP set #2.

For example, the message transmitted from the cellular base station 210 to the UE 220 in operation 235 may be configured as in the following Table 1.

TABLE 1

```
--ASN1START
MeasOjectWLAN ::= SEQUENCE {
Channel WLANChannel OPTIONAL,
apgroupidsToRemoveList GroupIndexList OPTIONAL,
apgroupidsToAddModList APGroupIDsToAddModList OPTIONAL,
}
APGroupIDsToAddModList ::= SEQUENCE (size (1..maxGroupMeas))
OF
APGroupIDsToAddMod
APGroupIDsToAddMod ::= SEQUENCE {
groupIndex INTEGER(1.. maxGroupMeas),
apGroupid APGroupID,
apidsToRemoveList CellIndexList OPTIONAL,
apidsToAddModList APIDsToAddModList OPTIONAL,
}
APIDsToAddModList ::= SEQUENCE (size (1..maxCellMeas)) OF
APIDsToAddMod
APIDsToAddMod ::= SEQUENCE {
cellIndex INTEGER(1..maxCellMeas),
apid APID,
}
APID ::= BITSTRING (SIZE(XX))
APGroupID ::= BITSTRING (SIZE(XX))
--ASN1STOP
```

When there is no need for specifying each AP in operation 235, the cellular base station 210 may transmit only the information regarding the AP set (i.e., the ID of the AP set) to the UE 220. The network manager (e.g., the cellular base station 210) may publicize information on APs or AP sets present adjacent to the network, not present in the network, or known thereto and may also publicize information on APs and AP sets supported by a particular service provider. When receiving the notified information, the UE 220 may compare the publicized information and information transmitted by each AP to specify each AP. When the ID specifying each AP and AP set is unique information included in a particular frame, e.g., beacon signal or information transmission signal, transmitted from the AP and AP set, no additional information is needed for the comparison. However, when the network manager specifies the AP and AP set using a new ID not included in the particular frame transmitted from each AP and AP set, additional information may be needed for cross comparison and matching between the new ID and the frame transmitted by the AP and AP set. Such additional information may be a table including the correlation with a particular ID or assigned by the network and unique information (e.g., MAC address or PHY address) included in the frame transmitted by the AP and AP set or a particular function by which, when one of the unique information pieces included in the frame transmitted by the AP and AP set and the ID is known, the other pieces of unique information may also be derived, as transmitted by the network manager. When the ID is assigned and/or specified as a portion of the unique information included in the frame transmitted by the AP and AP set, any information as well as the function or table may not be provided, or additional information may be provided which indicates what portion has been assigned or specified as the ID. The additional information for cross comparison and matching between the ID and the frame transmitted from the AP and AP set may be transmitted once upon association of each terminal to the network or configuring the network, periodically, whenever a change is made to the content in the additional information, at the request of the terminal, or when the network sends a request for a particular operation regarding the AP and AP set to the terminal.

In operation 240, the UE 240 may perform measurement on the APs. The UE 240 may perform measurement on the APs or AP set identified by the information received in operation 235. According to an embodiment of the present disclosure, operation 240 may be performed ahead of operation 235. In such case, among measurement results on the APs, only measurement results on the APs or AP set identified by the information received in operation 235 may be used by the UE 240 in subsequent procedures.

The UE 240 may perform measurement on each AP or AP set. When the UE 240 performs measurement on each of the APs, the UE 240 may measure, for each AP, one or more of signal to noise ratio (SNR), signal to interference plus noise ratio (SINR), modulation and coding scheme (MCS), received signal strength indicator (RSSI), channel quality index (CQI), bit error rate (BER), packet error rate (PER), collision probability, transmission failure probability, channel utilization, and distance from AP, but without limited to such measured items.

When the UE 240 performs measurement on the AP set, the UE 240 may derive a representative value for the AP set. The UE 240 may determine, as the representative value for the AP set, one or more of i) the measurement value presenting highest performance among the measurement values on the APs in the set, ii) the measurement value presenting poorest performance among the measurement values on the APs in the set, iii) the mean value for the measurement values for the APs in the set, iv) the shortest one of distances from the APs in the set, v) the longest one of distances from the APs in the set, and vi) the measurement value of any one of APs in the set. The representative value for the AP set may be represented as a resultant value by a function using the measurement values of one or more APs as variables or may be derived using one or more of the above methods for determining the representative value. The measured items for the APs in the set to derive the representative value for the AP set may be the same as the measured items for each AP.

In operation 245, the UE 220 may transmit the measurements on the APs to the cellular base station 210. Specifically, the UE 220 may transmit all or any one of the measurements on each AP and the measurement on the AP set (i.e., the representative value for the AP set) to the cellular base station 210. Upon determining that the UE 220 need not transmit the measurements on the APs to the cellular base station 210, operation 245 may be omitted. The measurements on the APs may be transmitted along with a triggered event transmitted in operation 255 described below, and according to an embodiment of the present disclosure, operation 245 may also be performed after operation 255.

When receiving the measurements on the APs, the cellular base station 210 may perform various operations based on the measurements. This is described below in detail with reference to operations 260 and FIG. 8.

In operation 250, the UE 220 may detect triggered events based on the measurement results. An exemplary list of events that may be detected by the UE 220 is shown below in Table 2.

TABLE 2

| Event | Detail |
|---|---|
| W1 | (Target AP(APG) $\in L_{AP}$) && (Target AP(APG) > S_association) |
| W2 | (Serving AP(APG) < S_disassociation) && (All the (APs(APGs) $\in L_{AP}$) < S_association) |
| W3-1 | {(Serving AP(APG) < S_association_1) \|\| ((Target AP(APG) $\in G^C_{AP}$) - Serving AP(APG) > S_handover)} && (Target AP(APG) $\in G^C_{AP}$ > S_association_2) |
| W3-2 | {(Serving AP(APG) < S_association_1) \|\| ((Target AP(APG) $\in G^C_{AP}$) - Serving AP(APG) > S_handover)} && (All the (APs(APG) $\in G_{AP}$) < S_association_2) && (Target AP(APG) $\in G^C_{AP}$ > S_association_3) |
| W3-3 | ((Target AP(APG) $\in G^C_{AP}$) - Serving AP(APG) > S_handover)} && (Target AP(APG) $\in G^C_{AP}$ > S_association) |
| W3-4 | (All the (APs(APG) $\in G_{AP}$) < S_association_1) && (Target AP(APG) $\in G^C_{AP}$ > S_association_2) |
| W4-1 | (Serving AP < Srequired_WLAN) \|\| {(Serving AP < Srequired_WLAN ) && (Serving LTE > Srequired_LTE) |
| W4-2 | (Serving LTE < Srequired_LTE) \|\| {(Serving LTE < Srequired_LTE ) && (Serving AP > Srequired_WLAN) |

Here, AP (APG) means some AP or some AP set. APG means the AP set, $L_{AP}$ means a list of all the known APs associated with the cellular base station 210, and $G_{AP}$ means the set where the AP serving the UE 220 belongs among known AP sets. When only one AP set is defined between the cellular base station 210 and the UE 220, $G_{AP}$ may be the same as $L_{AP}$.

The occurrence of event W1 may be a condition for association or re-association for the target AP or AP set. In event W1, "Target AP(APG)∈$L_{AP}$" means that the target AP (i.e., the AP for which measurement or measurement reporting is targeted for) or AP group is included in the APs associated with the cellular base station 210. "Target AP(APG)>S_association" means that the measurement value for the target AP or AP set exceeds a threshold for association. That is, event W1 may be triggered when the measurement value for the target AP or APG associated with the cellular base station exceeds the threshold. Here, the measurement value may be one of RSSI, SNR, SINR, CQI, reference signal received power (RSRP), and reference signal received quality (RSRQ), and the higher measurement value may denote the better channel quality. The UE 220, upon detecting the W1 event being triggered, may take no action, report the triggering of W1 event to the cellular base station 210, or attempt to associate to the target AP without reporting the event to the cellular base station 210.

The occurrence of event W2 may be a condition for disassociation from the AP set. In event W2, "Serving AP(APG)<S_disassociation" means that the measurement value for the serving AP or AP set is less than a threshold for disassociation. "All the (APs(APGs)∈$L_{AP}$<S_association" means that the measurement value for the AP or AP set included in all the known APs associated with the cellular base station 210 is less than a threshold. That is, when only one AP set is configured between the UE 220 and the cellular base station 210, event W2 may be triggered when the measurement values for the APs in the set are less than the threshold. Here, the measurement value may be set so that the higher, the better channel quality based on the measurement. The UE 220, upon detecting the W2 event being triggered, may take no action, report the triggering of W2 event to the cellular base station 210, or attempt to disassociate from the associated AP without reporting the event to the cellular base station 210.

Event W3-1 may be a condition for handover between AP sets. Event W3-1 may be triggered when the measurement value for the serving AP or AP set is less than a threshold for disassociation (S_disassociation), when the measurement value for the serving AP or AP group in the measurement value for the target AP or AP set which is a target for handover and does not belong to the AP set where the serving AP belongs is less than a threshold (S_handover) for handover, or when the measurement value for the target AP or AP set is not less than a threshold (S_association) for association. The UE 220, upon detecting the W3-1 event being triggered, may take no action, report the triggering of W3-1 event to the cellular base station 210, or attempt to hand over to the target AP without reporting the event to the cellular base station 210.

Event W3-2 may be another condition for handover between AP sets. Event W3-2 may be triggered when the measurement value for the serving AP or AP set is less than a threshold for disassociation (S_disassociation), when the measurement value for the serving AP or AP group in the measurement value for the target AP or AP set which is a target for handover and does not belong to the AP set where the serving AP belongs is less than a threshold (S_handover) for handover, or when the measurement value for the APs in all the sets where the serving AP belongs or the set is less than a threshold for association, and the measurement value for the target AP or AP set which is a target for handover and does not belong to the AP set where the serving AP belongs is more than the threshold for association. The UE 220, upon detecting the W3-2 event being triggered, may take no action, report the triggering of W3-2 event to the cellular base station 210, or attempt to hand over to the target AP without reporting the event to the cellular base station 210.

Event W3-3 may be another condition for handover between AP sets. Event 3-3 may be triggered when the value obtained by subtracting the measurement value for the serving AP or AP set from the measurement value for the target AP or AP set that does not belong to the AP set where the serving AP belongs is more than the threshold for handover, and the measurement value for the target AP or AP set that does not belong to the AP set where the serving AP belongs is more than the threshold for association. The UE 220, upon detecting the W3-3 event being triggered, may take no action, report the triggering of W3-3 event to the cellular base station 210, or attempt to hand over to the target AP without reporting the event to the cellular base station 210.

Event W3-4 may be another condition for handover between AP sets. Event W3-4 may be triggered when the measurement value for all the APs belonging to the AP set where the serving AP belongs or the set is less than the threshold for association and the measurement value for the target AP or AP group not belonging to the AP set where the serving AP belongs is more than the threshold for the association. The UE 220, upon detecting the W3-3 event being triggered, may take no action, report the triggering of W3-3 event to the cellular base station 210, or attempt to hand over to the target AP without reporting the event to the cellular base station 210.

Event W4-1 is a condition for traffic steering. For example, when the AP is a WLAN AP, and the cellular base station 210 is a LTE base station, traffic steering from WLAN to LTE may be performed when event W4-1 occurs. Event W4-1 may be triggered when the measurement value for the serving AP is less than a threshold (Srequired_WLAN) or when the measurement value for the serving AP is less than the threshold (Srequired_WLAN) and the measurement value for the serving LTE base station is more than a threshold (Srequired_LTE). The UE 220, upon detecting the W4-1 event being triggered, may take no action, report the triggering of W4-1 event to the cellular base station 210, or directly attempt traffic steering from the serving AP to the LTE base station without reporting the event to the cellular base station 210.

Event W4-2 is a condition for traffic steering. For example, when the AP is a WLAN AP, and the cellular base station 210 is a LTE base station, traffic steering from LTE to WLAN may be performed when event W4-2 occurs. Event W4-2 may be triggered when the measurement value for the serving LTE base station is less than a threshold (Srequired_LTE) or when the measurement value for the serving LTE base station is less than the threshold (Srequired_LTE) and the measurement value for the serving AP is more than a threshold (Srequired_WLAN). The UE 220, upon detecting the W4-2 event being triggered, may take no action, report the triggering of W4-2 event to the cellular base station 210, or directly attempt traffic steering from the serving LTE base station to the WLAN AP without reporting the event to the cellular base station 210.

According to an embodiment of the present disclosure, the user's preference may be additionally taken into account for triggering events. The user's preference may indicate whether the user favors association to a particular AP or the user's agreement on using the AP for convergence on the cellular and non-cellular networks. Table 3 represents a list of events additionally considering the user's preference.

TABLE 3

| Event | Detail |
|---|---|
| W1-U | (Target AP(APG) ∈ $L_{AP}$) <br> && (Target AP(APG) > S_association) <br> && User Prefers LTE-WLAN Aggregation |
| W2-1-U | (Serving AP(APG) < S_disassociation) && (All the (APs(APGs) ∈ $L_{AP}$) < S_association) |
| W2-2-U | User Does Not Prefer LTE-WLAN Aggregation |
| W3-1-U | {(Serving AP(APG) < S_association_1) ∥ ((Target AP(APG) ∈ $G^C{}_{AP}$) - Serving AP(APG) > S_handover)} <br> && (Target AP(APG) ∈ $G^C{}_{AP}$ > S_association_2) <br> && User Prefers LTE-WLAN Aggregation |
| W3-2-U | {(Serving AP(APG) < S_association_1) ∥ ((Target AP(APG) ∈ $G^C{}_{AP}$) - Serving AP(APG) > S_handover)} <br> && (All the (APs(APG) ∈ $G_{AP}$) < S_association_2) <br> && (Target AP(APG) ∈ $G^C{}_{AP}$ > S_association_3) <br> && User Prefers LTE-WLAN Aggregation |
| W3-3 | ((Target AP(APG) ∈ $G^C{}_{AP}$) - Serving AP(APG) > S_handover)} <br> && (Target AP(APG) ∈ $G^C{}_{AP}$ > S_association) |
| W3-4 | (All the (APs(APG) ∈ $G_{AP}$) < S_association_1) <br> && (Target AP(APG) ∈ $G^C{}_{AP}$ > S_association_2) |
| W4-1 | (Serving AP < Srequired_WLAN) ∥ {(Serving AP < Srequired_WLAN ) && (Serving LTE > Srequired_LTE) |
| W4-2 | (Serving LTE < Srequired_LTE) ∥ {(Serving LTE < Srequired_LTE ) && (Serving AP > Srequired_WLAN) |

Referring to Table 3, the user's preference may be considered in addition to the above-described events W1, W2, W3-1, and W3-2.

The added event W2-2-U may be a condition for disassociation. Event W2-2-U may be triggered when the user does not prefer the serving AP or the user disagrees with the use of the serving AP for convergence of the cellular and non-cellular networks.

Besides, other various conditions may also be considered to trigger the events, such as when the load for the AP is less than a threshold, when the channel utilization of the AP is less than a threshold, and when the interference with the AP is less than a threshold.

Although a number of events detectable in operation 250 have been described above, the above-described events are merely an example, and other unmentioned types of events, e.g., an event for handover in a set of APs, may also be detected.

According to an embodiment of the present disclosure, the cellular base station 210 may transmit a list of a plurality of events to the UE 220 before operation 250. In operation 250, the UE 220 may detect an event triggered in the received list of multiple events.

In operation 255, the UE 220 may transmit information on the triggered event to the cellular base station 210. The UE 220 may transmit the name of the event, as the information on the triggered event, to the cellular base station 210. When the definitions of events are shared between the UE 220 and the cellular base station 210, the cellular base station 210 may grasp the state of the UE 220 in a simplified manner by sending the names of the events to the cellular base station 210. For example, when the triggering of event W1 is detected, the UE 220 may notify the cellular base station 210 on only the indication of W1, simply as the triggered event. Operation 255 may be omitted when the UE 220 determines that the triggered event need not be reported.

In operation 260, the cellular base station 210 may perform an operation according to the triggered event. In operation 265, the UE 220 may perform an operation according to the triggered event. The operation according to the triggered event by the cellular base station 210 may be an operation for supporting the operation of the UE 220.

Figure 6:
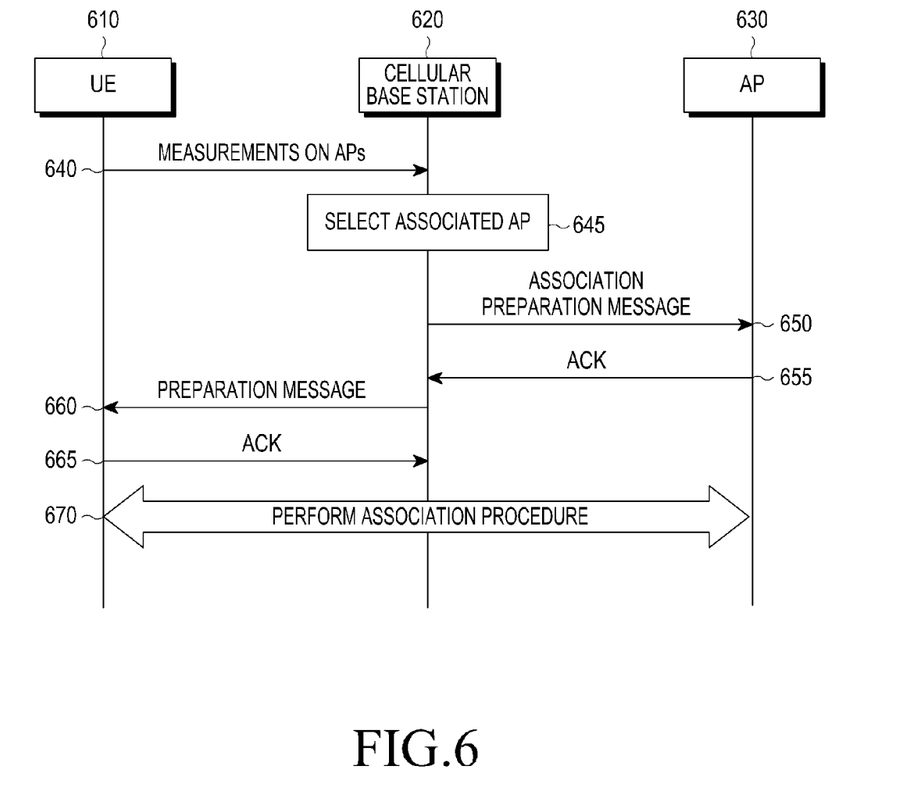
FIG. 6 illustrates an example flowchart of a procedure in which a cellular base station supports association of a UE to an AP according to an embodiment of the present disclosure.

For example, when the cellular base station 210 is notified of event W1 in operation 255, if the target AP is a base station associated with the cellular base station 210, the cellular base station 210 may support association of the UE 220 to the target AP. A method for supporting association of the UE 220 to the target AP by the cellular base station 210 is described below in further detail with reference to FIG. 6. FIG. 6 illustrates an example flowchart of a procedure in which a cellular base station supports association of a UE to an AP according to an embodiment of the present disclosure.

Referring to FIG. 6, the UE 610 may report measurements on the APs to the cellular base station 620. The measurements on the APs, along with the IDs of the APs, may be transmitted.

In operation 645, the cellular base station 620 may select an associated AP among the APs whose measurements have been received.

In operation 650, the cellular base station 620 may transmit an association preparation message to the selected AP 630. The ID of the network where the AP 630 of the UE 610 belongs may be transmitted along with the association preparation message. For example, when the AP is a WLAN AP, the WLAN ID of the UE may be transmitted.

In operation 655, the AP 630 may transmit an acknowledge response (hereinafter, simply "Ack") to the cellular base station 620.

In operation 660, the cellular base station 620 may transmit an association command indicating the association to the AP 630 to the UE 610. The ID of the AP 630, together with the association command, may be transmitted.

In operation 665, the UE 610 may transmit an Ack to the cellular base station 620 in response to the association command.

In operation 670, an association procedure between the UE 610 and the AP 630 may be performed.

Referring back to FIG. 2, when the cellular base station 210 is notified of event W2 in operation 255, if the target AP is an AP associated with the cellular base station 210, the cellular base station 210 may support disassociation of the UE 220 from the target AP.

Figure 7:
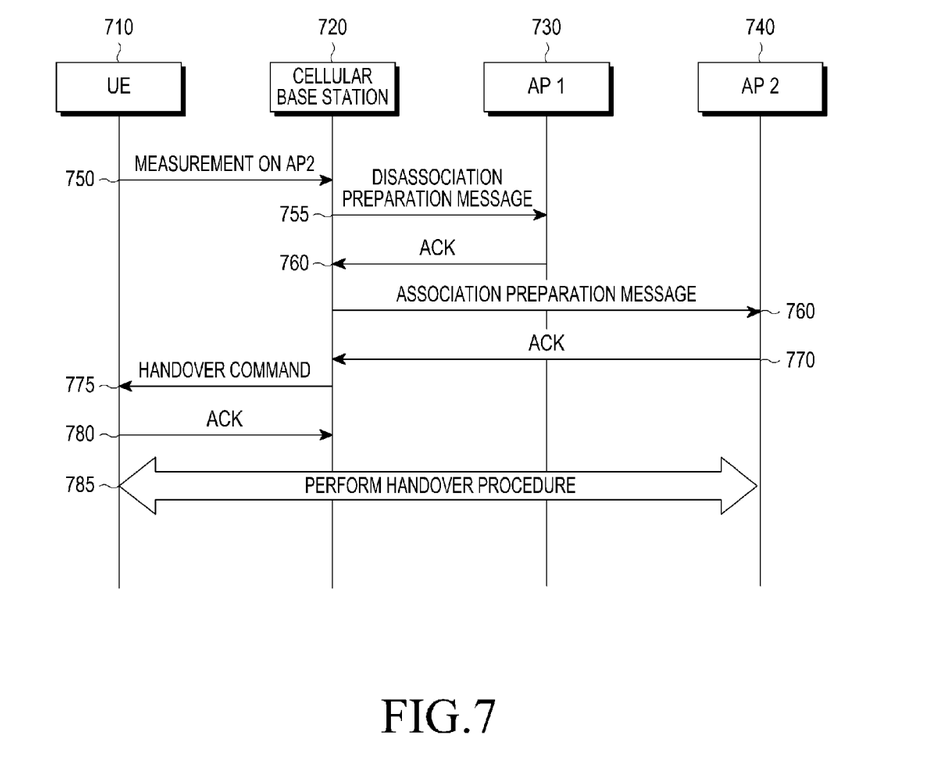
FIG. 7 illustrates an example flowchart of a procedure in which a cellular base station supports handover of a UE from an AP associated with the cellular base station to another AP associated with the cellular base station according to an embodiment of the present disclosure.

For example, when the cellular base station 210 receives an event for handover in the set of the APs in operation 255, the cellular base station may support handover. A method for supporting handover in a set of APs by the cellular base station 210 is described below in detail with reference to FIG. 7. FIG. 7 illustrates an example flowchart of a procedure in which a cellular base station supports handover of a UE from an AP associated with the cellular base station to another AP associated with the cellular base station according to an embodiment of the present disclosure.

In FIG. 7, an AP1 730 may be a serving AP for the UE 710, and an AP2 740 may be a target AP of handover. The AP1 730 and the AP2 740 both may be associated with the cellular base station 720, and the AP1 730 and the AP2 740 may be included in the same set of APs.

In operation 750, the UE 710 may report a measurement on the AP2 740, which is the target AP of handover, to the cellular base station 720. The ID of the AP2 740 for identifying the AP2 740 or the ID of the set where the AP2 740 belongs may be transmitted along with the measurement on the AP2 740.

In operation 755, the cellular base station 720 may transmit a disassociation preparation message to the AP1 730. The disassociation preparation message may be transmitted together with the ID (e.g., WLAN ID) of the UE.

In operation 760, the AP1 730 may transmit an Ack to the cellular base station 720 in response to the disassociation preparation message.

In operation 765, the cellular base station 720 may transmit an association preparation message to the AP2 740. The association preparation message may be transmitted together with the ID (e.g., WLAN ID) of the UE.

In operation 770, the AP2 740 may transmit an Ack to the cellular base station 720 in response to the association preparation message.

In operation 775, the cellular base station 720 may transmit a handover command for instructing handover to the AP2 740 to the UE 710. The ID of the AP2 740 to specify the AP2 740 or the ID of the set where the AP2 belongs, together with the handover command, may be transmitted.

In operation 780, the UE 710 may transmit an Ack to the cellular base station 720 in response to the handover command.

In operation 785, a handover procedure between the UE 710 and the AP2 740 may be carried out.

Figure 8:
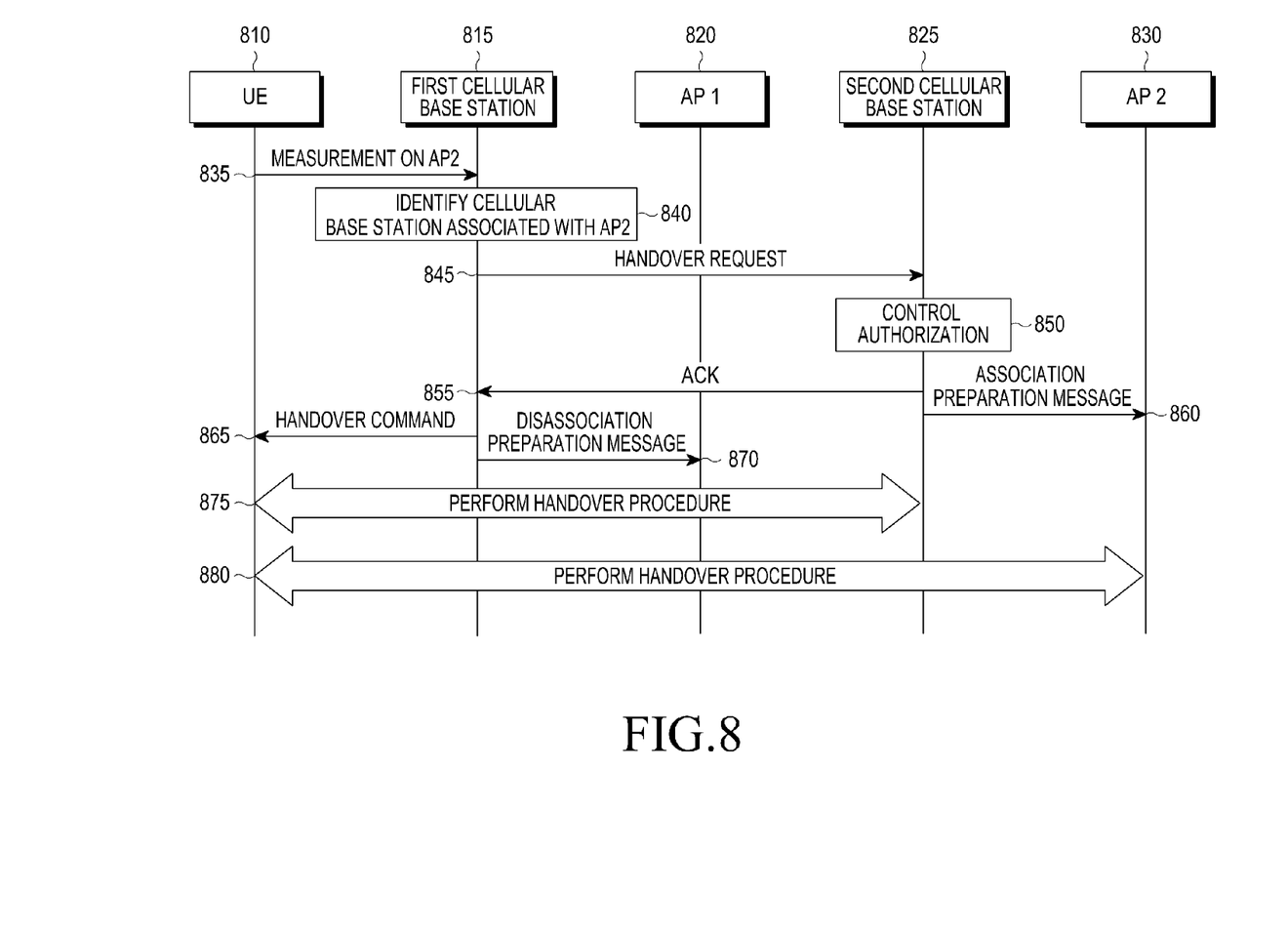
FIG. 8 illustrates an example flowchart of a procedure in which a cellular base station supports handover of a UE from an AP associated with the cellular base station to an AP associated with another cellular base station according to an embodiment of the present disclosure.

Referring back to FIG. 2, when the cellular base station 210 is notified of one of events W3-1, W3-2, W3-3, and W3-4 in operation 255, if the target AP is an AP associated with another cellular base station, the cellular base station 210 may support handover of the UE 220 to the target AP. This is described in more detail with reference to FIG. 8. FIG. 8 illustrates an example flowchart of a procedure in which a cellular base station supports handover of a UE from an AP associated with the cellular base station to an AP associated with another cellular base station according to an embodiment of the present disclosure.

Referring to FIG. 8, the AP1 820 which is a serving AP of the UE 810 is associated with a first cellular base station 815 which is a serving base station, and the AP2 830 which is a target AP of the handover is associated with a second cellular base station 825.

In operation 835, the UE 810 may report a measurement on the AP2 830, which is the target AP of handover, to the first cellular base station 815. The ID of the AP2 830 for identifying the AP2 830 or the ID of the set where the AP2 830 belongs may be transmitted along with the measurement on the AP2 830.

In operation 840, the first cellular base station 815 may identify the cellular base station (i.e., the second cellular base station 825) associated with the AP2 830.

In operation 845, the first cellular base station 815 may transmit a handover request to the second cellular base station 825. IDs (e.g., the UE's LTE ID and WLAN ID) for identifying the UE 810 in the cellular base station network and network of the APs may be transmitted along with the handover request.

In operation 850, the second cellular base station 825 may control the authorization for the handover request (i.e., determine whether to authorize).

In operation 855, when the second cellular base station 825 determines to authorize the handover request, the second cellular base station 825 may transmit an Ack responsive to the handover request to the first cellular base station 815. The Ack responsive to the handover request may include the ID of the second cellular base station 825 which is the target cellular base station of handover and the ID of the AP2 830 which is the target AP or the ID of the set where the AP2 830 belongs.

In operation 860, the second cellular base station 825 may transmit a handover preparation message to the AP2 830. The handover preparation message may be transmitted together with the ID (e.g., WLAN ID) of the UE.

In operation 865, the first cellular base station 815 may transmit a handover command instructing handover to the AP2 830 and the second cellular base station 825 to the UE 810. The handover command may include the ID of the second cellular base station 825 and the ID of the AP2 830 or the ID of the set where the AP2 830 belongs.

In operation 870, the first cellular base station 815 may transmit a disassociation preparation message to the AP1 820. The disassociation preparation message may be transmitted together with the ID (e.g., WLAN ID) of the UE.

In operation 875, a handover procedure between the UE 810 and the second cellular base station 825 may be carried out.

In operation 880, a handover procedure between the UE 810 and the AP2 830 may be carried out.

In FIGS. 6 to 8, signals transmitted to the AP, AP1, or AP2 and signals transmitted from the AP, AP1, or AP2 may be communicated directly to the AP, AP1, or AP2, or in some embodiments, via a WLAN group manager, WLAN termination, or AP controller (APC).

Referring back to FIG. 2, when the cellular base station 210 is notified of event W4-1 in operation 255, if the AP which is a target for measurement is an AP associated with the cellular base station 210, the cellular base station 210 may support or control traffic steering from the AP to the cellular base station 210.

For example, when the cellular base station 210 is notified of event W4-2 in operation 255, if the AP which is a target for measurement is an AP associated with the cellular base station 210, the cellular base station 210 may support or control traffic steering from the cellular base station 210 to the AP.

Figure 9:
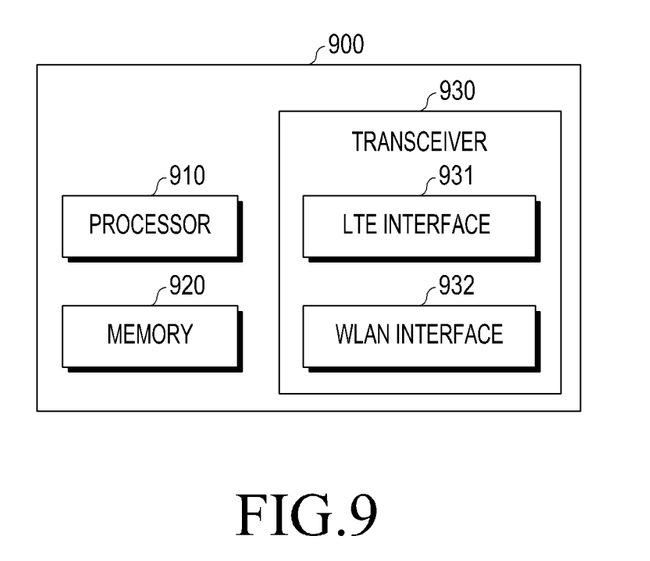
FIG. 9 illustrates an example block diagram of a user equipment according to an embodiment of the present disclosure.

A UE is described below with reference to FIG. 9. FIG. 9 illustrates an example block diagram of a user equipment according to an embodiment of the present disclosure. The UE 900 may be configured to perform the UE's operations described above in connection with FIGS. 2, 6, 7, and 8. Referring to FIG. 9, the UE 900 may include a processor 910, a memory 920, and a transceiver 930. The processor 910 may be communicably and electrically connected with the memory 920 and the transceiver 930. The UE 900 may transmit or receive signals and communicate with other entities through the transceiver 930. The transceiver 930 may include a LTE interface 931 for communicating with a cellular base station and a WLAN interface 932 for communicating with a non-cellular AP. The transceiver 930 may include additional communication interfaces depending on RATs supported by the UE 900. For example, the transceiver 930 may further include a ZigBee interface, Bluetooth interface, and CDMA interface. The memory 920 may store information for operations of the UE 900. The memory 920 may store commands or codes for controlling the processor 910. The processor 910 may be configured to control the operation of the UE 900. The above-described operations of the UE 900 may be processed and run substantially by the processor 910. Although transmission or reception of signals is performed through the transceiver 930, and storage of data and commands is carried out by the memory 920, the operations of the transceiver 930 and the memory 920 may be controlled by the processor 910, and thus, transmission and reception of signals and storage of data and commands may also be deemed to be performed by the processor 910.

Figure 10:
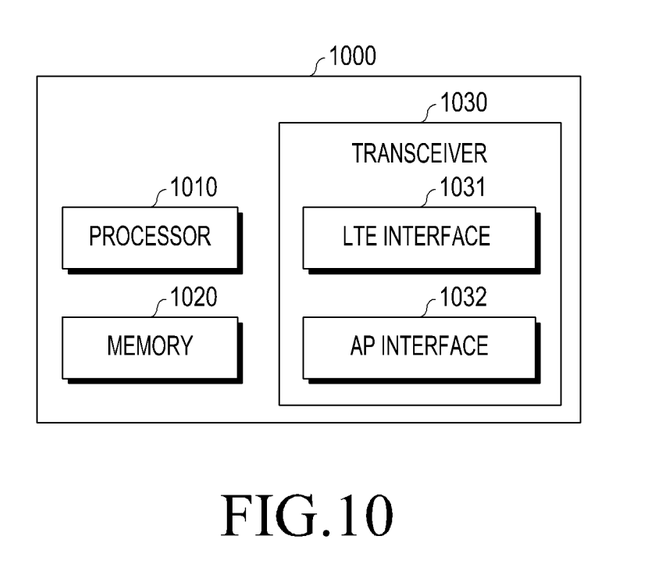
FIG. 10 illustrates an example block diagram of a cellular base station according to an embodiment of the present disclosure.

A cellular base station is described below with reference to FIG. 10. FIG. 10 illustrates an example block diagram of a cellular base station according to an embodiment of the present disclosure. The cellular base station 1000 may be configured to perform the cellular base station's operations described above in connection with FIGS. 2, 6, 7, and 8. Referring to FIG. 10, the cellular base station 1000 may include a processor 1010, a memory 1020, and a transceiver 1030. The processor 1010 may be communicably and electrically connected with the memory 1020 and the transceiver 1030. The cellular base station 1000 may transmit or receive signals and communicate with other entities through the transceiver 1030. The transceiver 1030 may include a LTE interface 1031 for communicating with a UE and an AP interface 1032 for communicating with associated non-cellular APs. The transceiver 1030 may include additional communication interfaces depending on RATs supported by the cellular base station 1000. For example, the transceiver 1030 may further include a CDMA interface or GSM interface. The memory 1020 may store information for operations of the cellular base station 1000. The memory 1020 may store commands or codes for controlling the processor 1010. The processor 1010 may be configured to control the operation of the cellular base station 1000. The above-described operations of the cellular base station 1000 may be processed and run substantially by the processor 1010. Although transmission or reception of signals is performed through the transceiver 1030, and storage of data and commands is carried out by the memory 1020, the operations of the transceiver 1030 and the memory 1020 may be controlled by the processor 1010, and thus, transmission and reception of signals and storage of data and commands may also be deemed to be performed by the processor 1010.

It may be further appreciated by one of ordinary skill in the art that various exemplary logic blocks, modules, circuits, methods, and algorithms described in connection with embodiments described herein may be implemented in hardware, computer software, or a combination thereof. In order to clarify interchangeability between hardware and software, various exemplary components, blocks, modules, circuits, methods, and algorithms have been generally described in light of their functionality. Whether such functionality is implemented in hardware or software relies on a particular application and design limitations given to the overall system. The disclosed functionality may be embodied in various manners on each particular application by one of ordinary skill in the art, but such determination should not be interpreted as causing departure from the category of the present disclosure.

Various exemplary logic blocks, modules, and circuits described herein in embodiments the present disclosure may be implemented or performed by a general-purpose processor, digital signal processor (DSP), application specific integrated circuit (ASIC), field programmable gate array (FPGA) or other programmable logic device, discrete gate or transistor logic, discrete hardware components, or their combinations designed to carry out the functions disclosed herein. The general-purpose processor may be a microprocessor. Alternatively, the processor may be a common processor, controller, microcontroller, or state machine. Further, the processor may be implemented in a combination of computing devices, e.g., a combination of a DSP and a microprocessor, multiple microprocessors, one or more microprocessors integrated with a DSP core, or any other configurations.

The methods and algorithms described in connection with embodiments described herein may be directly implemented in hardware, a software module run by the processor, or in a combination thereof. The software module may reside in a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art. The storage medium may be combined with the processor so that the processor reads information out of the storage medium and record information in the storage medium. Alternatively, the storage medium may be integrated with the processor. The processor and storage medium may reside in an ASIC.

In one or more exemplary embodiments, the above-described functions may be implemented in hardware, software, firmware, or any combination thereof. When implemented in software, the functions may be stored as one or more instructions or codes in a computer readable medium or transmitted through the same. The computer readable medium includes both a communication medium and computer storage medium including any medium facilitating to transfer a computer program from one place to another. The storage medium may be any available medium accessible by a general-purpose or special-purpose computer. As a non-limiting example, such computer readable medium may include a RAM, ROM, EEPROM, CD-ROM or other optical disc storage, magnetic disk storage or other magnetic storage devices, or any other medium available for transferring or storing program code means in a desired form of instructions or data structures and accessible by a general-purpose or special-purpose computer or special-purpose processor. Further, the access means is properly denoted the computer readable medium. For example, when the software is transmitted from a website, server, or other remote source using a coaxial cable, optical fiber cable, twisted pair, digital subscriber line (DSL), or infrared (IR) rays, or wireless techniques using wireless and microwaves, the coaxial cable, optical fiber cable, twisted pair, DSL, IR rays, and wireless techniques using wireless and microwaves belong to the definition of the medium. As used herein, the term "disk" or "disc" encompasses compact disc (CD), laser disc, optical disc, digital versatile disc (DVD), floppy disk, and Blu-ray disc, and here, the disk reproduces data generally magnetically while the disc reproduces data optically using laser beams. Combinations of those described above should be included in the computer readable medium.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing communication by a cellular base station, the method comprising:
   transmitting information on a set of one or more non-cellular access points (APs) associated with the cellular base station and information on a plurality of events triggering measurement reporting for the one or more non-cellular APs, to a user equipment (UE); and
   receiving measurement report of at least one AP in the set in response to an event triggered based on a measurement result of at least one AP in the set, the triggered event being one of the events configured by the information, from the UE.

2. The method of claim 1, wherein the information on the set of one or more non-cellular APs to the UE includes
   an identifier (ID) of each of the APs in the set or an identifier (ID) for the set.

3. The method of claim 2, wherein the ID of each of the APs is based on at least one of a service set identifier (SSID), basic SSID (BSSID), or homogeneous extended SSID (HESSID) of the at least one AP.

4. The method of claim 1, wherein the event of the plurality of events triggered under a condition where a measurement value for the at least one AP being more than a threshold.

5. The method of claim 1, wherein the event of the plurality of events is triggered under a condition where measurement values for all of the APs in the set of one or more non-cellular APs being less than a threshold, and a measurement value for an AP not belonging to the set of one or more non-cellular APs being not less than a second threshold.

6. The method of claim 1, wherein the event of the plurality of events is triggered under a condition where measurement values for all of the APs in the set of one or more non-cellular APs being less than a threshold.

7. The method of claim 1, wherein the cellular base station is a long term evolution (LTE) base station and the set of one or more non-cellular APs are wireless local area network APs (WLAN APs).

8. The method of claim 1, wherein the event of the plurality of events is triggered under a condition where a measurement value for the AP being less than a threshold, or a measurement value for the AP are less than a threshold and a measurement value for the cellular base station is more than a second threshold.

9. The method of claim 1, wherein the event of the plurality of events is triggered under a condition where a measurement value for the cellular base station being less than a second threshold, or a measurement value for the cellular base station is less than a second threshold and a measurement value for the AP is more than a second threshold.

10. A cellular base station, comprising:
    a transceiver; and
    a processor connected with the transceiver, the processor configured to transmit information on a set of one or more non-cellular access points (APs) associated with the cellular base station and information on a plurality of events triggering measurement reporting for the one or more non-cellular APs, to a user equipment (UE) and receive measurement report of at least one AP in the set in response to an event triggered based on a measurement result of at least one AP in the set, the triggered event being one of the events configured by the information, from the UE.

11. The cellular base station of claim 10, wherein the event of the plurality of events is triggered under a condition where a measurement value for the AP being less than a threshold, or a measurement value for the AP are less than a threshold and a measurement value for the cellular base station is more than a second threshold.

12. The cellular base station of claim 10, wherein the event of the plurality of events is triggered under a condition where a measurement value for the cellular base station being less than a second threshold, or a measurement value for the cellular base station is less than a second threshold and a measurement value for the AP is more than a second threshold.

13. A method for performing communication by a user equipment (UE), the method comprising:
    receiving information on a set of one or more non-cellular access points (APs) associated with a cellular base station and information on a plurality of events triggering measurement reporting for the one or more non-cellular APs, from the cellular base station;
    detecting an event triggered based on a measurement result of at least one AP in the set, the triggered event being one of the events configured by the information; and
    transmitting measurement report of at least one AP in the set in response to the event triggered to the cellular base station.

14. The method of claim 13, wherein the information on the set of one or more non-cellular APs includes
    an identifier (ID) of each of the APs in the set or an identifier (ID) for the set.

15. The method of claim 14, wherein the ID of each of the APs is based on at least one of a service set identifier (SSID), basic SSID (BSSID), or homogeneous extended SSID (HESSID) of the AP.

16. The method of claim 13, wherein the event of the plurality of events is triggered under a condition where a measurement value for the at least one AP being more than a threshold.

17. The method of claim 13, wherein the event of the plurality of events is triggered under a condition where measurement values for all of the APs in the set of one or more non-cellular APs being less than a threshold, and a measurement value for an AP not belonging to the set of one or more non-cellular APs is more than a second threshold.

18. The method of claim 13, wherein the event of the plurality of events is triggered under a condition where measurement values for all of the APs in the set of one or more non-cellular APs being less than a threshold.

19. The method of claim 13, wherein the cellular base station is a long term evolution (LTE) base station, and the set of one or more non-cellular APs are wireless local area network APs (WLAN APs).

20. A user equipment (UE), comprising:
   a transceiver; and
   a processor configured to
   receive information on a set of one or more non-cellular access points (APs) associated with a cellular base station and information on a plurality of events triggering measurement reporting for the one or more non-cellular APs from the cellular base station, via the transceiver,
   detect an event triggered based on a measurement result of at least one AP in the set, the triggered event being one of the events configured by the information, and
   transmit measurement report of at least one AP in the set in response to the event triggered to the cellular base station.

* * * * *